United States Patent
Novak et al.

(10) Patent No.: US 10,992,138 B2
(45) Date of Patent: Apr. 27, 2021

(54) MASTERLESS DISTRIBUTED POWER TRANSFER CONTROL

(71) Applicant: Cummins Power Generation IP, Inc., Minneapolis, MN (US)

(72) Inventors: Andrew Novak, Minneapolis, MN (US); Kevin J. Aufderhar, Minneapolis, MN (US); Paul R. Dahlen, Grant, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days.

(21) Appl. No.: 16/404,834

(22) Filed: May 7, 2019

(65) Prior Publication Data
US 2019/0363539 A1 Nov. 28, 2019

Related U.S. Application Data

(63) Continuation of application No. 15/223,653, filed on Jul. 29, 2016, now Pat. No. 10,291,028.

(51) Int. Cl.
G05F 1/66 (2006.01)
G05B 1/02 (2006.01)
(Continued)

(52) U.S. Cl.
CPC ............... *H02J 3/382* (2013.01); *H02J 3/38* (2013.01); *H02J 3/383* (2013.01); *H02J 3/386* (2013.01); *H02J 3/48* (2013.01); *H02J 13/0006* (2013.01)

(58) Field of Classification Search
CPC .......... H02J 13/0006; H02J 3/38; H02J 3/383; H02J 2203/10; H02J 2213/10; H02J 3/46;
(Continued)

(56) References Cited

U.S. PATENT DOCUMENTS 3,714,452 A 1/1973 Williamson
3,748,489 A 7/1973 South
(Continued)

FOREIGN PATENT DOCUMENTS

AU 2016100265 4/2016
EP 2 145 374 1/2010

OTHER PUBLICATIONS

Extended European Search Report on European Application No. 17835293.6, dated Feb. 11, 2020, 5 pages.
(Continued)

*Primary Examiner* — Jared Fureman
*Assistant Examiner* — Esayas G Yeshaw
(74) *Attorney, Agent, or Firm* — Foley & Lardner LLP

(57) ABSTRACT

A method of power transfer control among a plurality of power sources coupled through a distribution system. The method comprises determining, at each power source of the plurality of power sources, an assignment of priorities for each of the plurality of power sources. The method also comprises obtaining, at each power source, information indicating an availability of each of the plurality of power sources and determining a set of available power sources, and identifying, at each power source, a preferred power source and a standby power source from the plurality of power sources. The method further comprises determining to change the preferred power source from a first power source to a second power source in response to detecting a condition, and conducting the power transfer.

19 Claims, 6 Drawing Sheets

(51) Int. Cl.
*G05B 11/01* (2006.01)
*H02J 3/38* (2006.01)
*H02J 3/48* (2006.01)
*H02J 13/00* (2006.01)

(58) Field of Classification Search
CPC .... H02J 3/386; H02J 2300/20; H02J 2300/10; H02J 3/382; H02J 3/001
See application file for complete search history.

(56) References Cited

U.S. PATENT DOCUMENTS

| | | | |
|---|---|---|---|
| 3,794,846 A | 2/1974 | Schlicher et al. | |
| 4,384,213 A | 5/1983 | Bogel | |
| 4,874,961 A | 10/1989 | Henderson | |
| 5,258,700 A | 11/1993 | Shimizu et al. | |
| 5,276,661 A | 1/1994 | Beg | |
| 5,592,393 A | 1/1997 | Yalla | |
| 6,194,794 B1 | 2/2001 | Lampe et al. | |
| 6,380,719 B2 | 4/2002 | Underwood et al. | |
| 6,483,204 B2 | 11/2002 | Hanaki | |
| 6,501,628 B1 | 12/2002 | Namba et al. | |
| 6,522,030 B1 | 2/2003 | Wall et al. | |
| 6,653,751 B1 | 11/2003 | Teh Lo | |
| 6,980,911 B2 | 12/2005 | Eaton et al. | |
| 7,016,793 B2 | 3/2006 | Ye et al. | |
| 7,091,702 B2 | 8/2006 | Mrowiec et al. | |
| 7,122,916 B2 | 10/2006 | Nguyen et al. | |
| 7,405,494 B2 | 7/2008 | Tassitino et al. | |
| 7,408,271 B2 | 8/2008 | Mercer | |
| 7,608,947 B2 | 10/2009 | Anderson et al. | |
| 7,635,967 B2 | 12/2009 | Loucks et al. | |
| 7,656,060 B2 | 2/2010 | Algrain | |
| 7,692,335 B2 | 4/2010 | Michalko | |
| 7,816,813 B2 | 10/2010 | Yagudayev et al. | |
| 7,923,853 B2 | 4/2011 | Lewis | |
| 8,013,474 B2 * | 9/2011 | Besser | G05F 1/67 136/248 |
| 8,103,387 B2 * | 1/2012 | Gothard | G06F 1/30 700/286 |
| 8,198,753 B2 | 6/2012 | Algrain | |
| 8,222,766 B2 | 7/2012 | Ma et al. | |
| 8,427,005 B1 | 4/2013 | Kisner et al. | |
| 9,019,673 B2 | 4/2015 | Varma et al. | |
| 9,190,848 B2 | 11/2015 | Collie | |
| 9,917,442 B2 | 3/2018 | Beauregard et al. | |
| 2004/0025496 A1 | 2/2004 | Patterson, Jr. | |
| 2004/0178770 A1 | 9/2004 | Gagnon et al. | |
| 2005/0213272 A1 | 9/2005 | Kobayashi | |
| 2009/0079266 A1 | 3/2009 | McNamara et al. | |
| 2009/0121547 A1 | 5/2009 | Paik et al. | |
| 2009/0326727 A1 | 12/2009 | Gothard | |
| 2010/0109447 A1 | 5/2010 | Achilles et al. | |
| 2011/0106322 A1 | 5/2011 | Ou | |
| 2012/0049638 A1 | 3/2012 | Dorn et al. | |
| 2012/0205986 A1 | 8/2012 | Frampton et al. | |
| 2012/0267957 A1 | 10/2012 | Czarnecki | |
| 2014/0077606 A1 | 3/2014 | Ci | |
| 2015/0035358 A1 | 2/2015 | Linkhart et al. | |
| 2015/0097437 A1 | 4/2015 | Votoupal et al. | |
| 2015/0115711 A1 | 4/2015 | Kouroussis et al. | |
| 2015/0236510 A1 | 8/2015 | Recio et al. | |
| 2016/0018161 A1 | 1/2016 | Satoh | |
| 2016/0099607 A1 | 4/2016 | Landis | |
| 2016/0111879 A1 | 4/2016 | Ayana et al. | |
| 2016/0143115 A1 * | 5/2016 | Zhang | H05B 47/185 315/294 |
| 2016/0181861 A1 | 6/2016 | Familiant et al. | |
| 2017/0192047 A1 * | 7/2017 | Qi | G01R 31/086 |
| 2017/0262007 A1 * | 9/2017 | Zhiwu | G05B 11/01 |
| 2019/0334376 A1 * | 10/2019 | Toyoda | H02J 9/062 |

OTHER PUBLICATIONS

International Search Report and Written Opinion issued for PCT/US2017/044226, dated Sep. 27, 2017, 11 pages.

* cited by examiner

| Priority | 1 | 2 | 3 | 4 | 5 | 6 |
|---|---|---|---|---|---|---|
| Power Source | U1 120 | U2 121 | G1 132 | G2 134 | G3 136 | G4 138 |

400

MASTERLESS DISTRIBUTED POWER TRANSFER CONTROL

CROSS-REFERENCE TO RELATED APPLICATIONS

This application is a Continuation of U.S. application Ser. No. 15/223,653, filed Jul. 29, 2016, which is incorporated herein by reference in its entirety.

BACKGROUND

Electric power generation and distribution systems generally comprise multiple sources of electric power coupled through a distribution network. To ensure constant availability of power to loads, power transfer occurs between multiple power sources coupled through the distribution network. For example, when a primary power source (e.g., a utility) on the load bus experiences a blackout, power is transferred from the primary power source to a secondary power source (e.g., another utility or a generator set). When the power outage of the primary power source is over, power is switched back to the primary power source. Fault-tolerant operations of power transfer are generally desired.

SUMMARY

One embodiment of the disclosure relates to a method of power transfer control among a plurality of power sources coupled through a distribution system. The method comprises determining, at each power source of the plurality of power sources, an assignment of priorities for each of the plurality of power sources. The priorities establish a hierarchy of the power sources for supplying power to a load. The method also comprises obtaining, at each power source, information indicating an availability of each of the plurality of power sources and determining a set of available power sources from among the plurality of power sources based on the information, and identifying, at each power source, a preferred power source and a standby power source from the plurality of power sources based on the priorities and the information. The preferred power source and the standby power source are among the set of available power sources, and the priority of the preferred power source is higher than the priority of the standby power source. The method further comprises determining, at each power source, to change the preferred power source from a first power source to a second power source in response to detecting a condition, and conducting, at the first power source and the second power source, a power transfer between the first power source and the second power source in response to determining to change the preferred power source to the second power source.

Another embodiment of the disclosure relates to an apparatus comprising a circuitry configured to determine an assignment of priorities for each of a plurality of power sources coupled through a distribution system. The priorities establish a hierarchy of the power sources for supplying power to a load. The circuitry is also configured to obtain information indicating an availability of each of the plurality of power sources and determine a set of available power sources from among the plurality of power sources based on the information, and identify a preferred power source and a standby power source from the plurality of power sources based on the priorities and the information. The preferred power source and the standby power source are among the set of available power sources, and the priority of the preferred power source is higher than the priority of the standby power source. The circuitry is further configured to determine to change the preferred power source from a first power source to a second power source in response to detecting a condition, and conduct a power transfer between the first power source and the second power source in response to determining to change the preferred power source to the second power source.

Still another embodiment of the disclosure relates to a generator set comprising an engine, a generator driven by the engine to generate electrical power, and a controller communicably coupled to the engine. The controller is configured to determine an assignment of priorities for each of a plurality power sources coupled through a distribution system, the plurality of power sources comprising the generator set. The priorities establish a hierarchy of the power sources for supplying power to a load. The controller is also configured to obtain information indicating an availability of each of the plurality of power sources and determining a set of available power sources from among the plurality of power sources based on the information, and identify a preferred power source and a standby power source from the plurality of power sources based on the priorities and the information. The preferred power source and the standby power source are among the set of available power sources, and the priority of the preferred power source is higher than the priority of the standby power source. The controller is further configured to determine to change the preferred power source from a first power source to a second power source in response to detecting a condition, and conduct a power transfer between the first power source and the second power source in response to determining to change the preferred power source to the second power source.

These and other features, together with the organization and manner of operation thereof, will become apparent from the following detailed description when taken in conjunction with the accompanying drawings.

DETAILED DESCRIPTION

Figure 1:
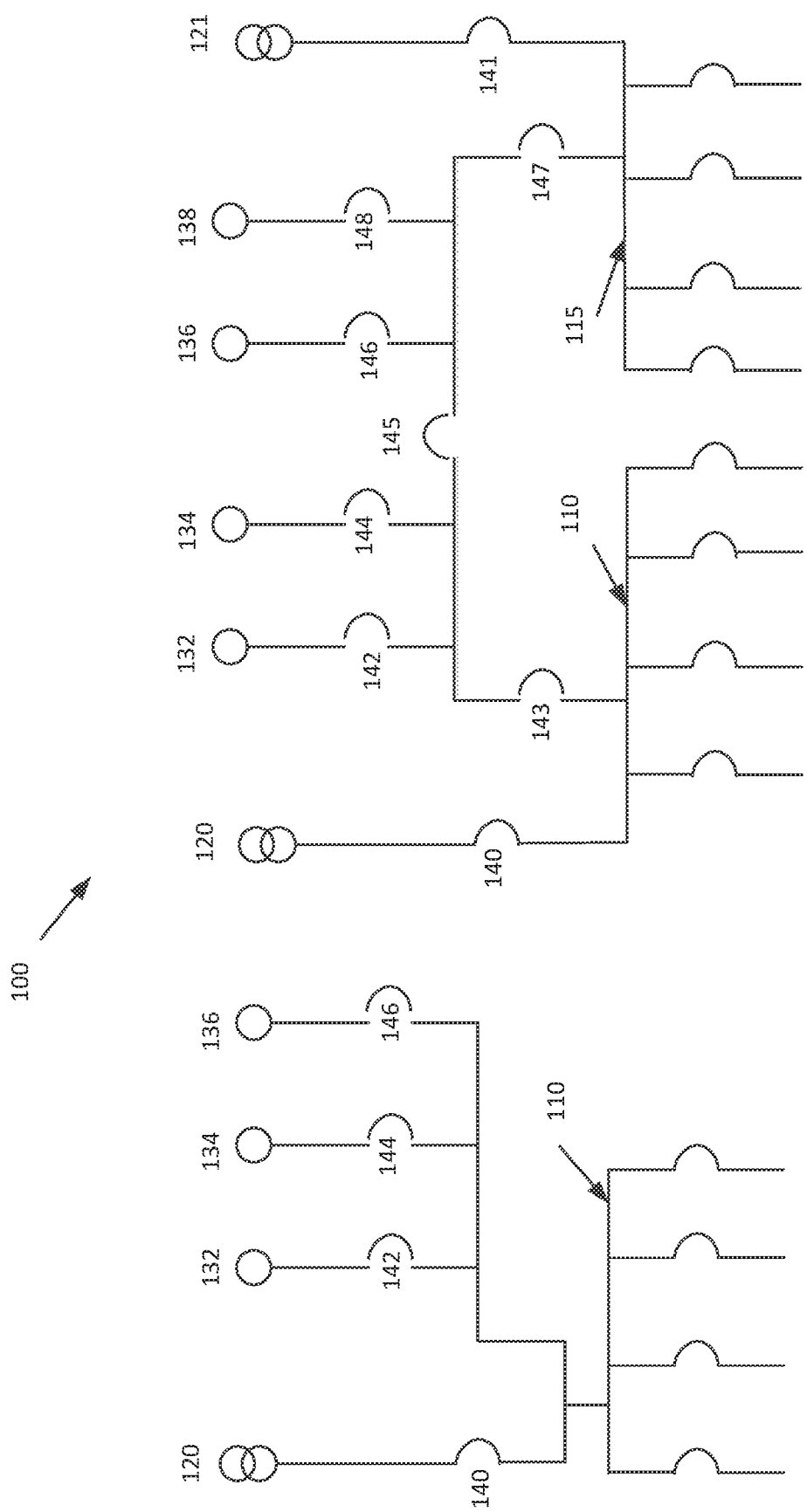
FIG. 1(A) is a schematic diagram of a power generation and distribution system according to an exemplary embodiment.
FIG. 1(B) is a schematic diagram of a power generation and distribution system according to another exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

To ensure constant availability of power to loads, power transfer can occur between multiple power sources coupled through the power generation and distribution network. Typically, the power generation and distribution system relies on a master controller to control the power transfer operations between power sources. However, the master controller introduces a single point of failure in the system and adds cost to the system. A fault-tolerant control of power transfer is desired by which the topology and control architectures can continue to operate despite faults and failures with some components or subsystems.

Referring to the figures generally, various embodiments disclosed herein relate to systems and methods for masterless distributed power transfer control. As used herein, the masterless distributed control refers to autonomous local control that operates without a centralized master controller. In particular, each power source is associated with and under direct control of a local controller, in some embodiments. The controllers are in communication with each other through a network. A priority is assigned to each power source, which establishes a hierarchy of the power sources for supplying power to the load. A power source with the highest priority supplies power to the load first. If the power source with the highest priority is unavailable, then the power source with the second highest priority will serve, and so on. A controller "knows" the availability of local power sources by sensing voltages or other characteristics of local power sources, and the availability of remote power sources by receiving information from other controllers over the network. The controller dynamically determines whether to conduct a power transfer operation and which power source to transfer to or from based on the data sensed and received. When a power transfer operation is needed and the destination power source is determined, the controller conducts the transfer accordingly. When a remote power source is involved in the transfer, the controller can use a remote source pointer to exercise control over the remote source. By this manner, the master controller can be removed from the power transfer control, setup time and cost can be reduced.

Referring to FIG. 1, schematic diagrams of a power generation and distribution system 100 are shown. FIG. 1(A) illustrates a power generation and distribution system 100 with one utility 120 and three generator sets (gensets) 132, 134, and 136 coupled to a common load bus 110 through switches 140, 142, 144, and 146, respectively. FIG. 1(B) illustrates a power generation and distribution system 100 with two load buses 110 and 115. Utility 120 is coupled to the load bus 110 through switch 140. Utility 121 is coupled to the load bus 115 through switch 141. Four gensets 132, 134, 136, and 138 are coupled to the distribution system 100 through switches 142, 144, 146, and 148, respectively. Switch 143 controls the connection of the gensets to the load bus 110. Switch 147 controls the connection of the genset to the load bus 115. Switch 145 controls the connection of the gensets 132 and 134 as a group to the genset 136 and 138 as another group. Components of the system 100 may be connected through a power grid. It shall be understood that FIGS. 1(A) and 1(B) are for illustration only; the system 100 can include any suitable numbers of utilities and gensets arranged in any suitable manner. It is noted that in a load sharing power transfer, the load may be transferred to multiple gensets and/or utility sources and the power for the load is shared by the sources. In some embodiments, the particular configuration of the sources and the schedule of the load can be used as a power transfer schedule with a given priority by user.

Each of the utilities 120 and 121 may provide, for example, a single, dual, or three-phase AC voltage with appropriate magnitude and frequency, e.g., 110 VAC with 50 Hz or 60 Hz.

Each of the gensets 132, 134, and 136 may include a prime mover (e.g., an engine) that is connected to a generator. The engine can be any type of engine that is suitable for producing mechanical power including, but not limited to, a diesel engine, a natural gas engine, a gasoline engine, etc. The generator can be any type of generator that is suitable for converting the mechanical power produced by the prime mover to electrical power, including, but not limited to, an alternator. Each of the gensets may be configured to generate power in a single, dual, or three-phase alternating current (AC). In some embodiments, one or more of the gensets 132, 134, and 136 may include a group of paralleled gensets, which can be considered as one source.

Each of the switches 140 through 148 may be an automatically operated circuit breaker that may be in either a closed state or an open state. When a circuit breaker is closed, an electrical connection may be formed between the two sides of the circuit breaker. When a circuit breaker is open, the two sides of the circuit breaker may be electrically disconnected. In FIG. 1(A), the switch 140 is closed, which connects the utility 120 to the load bus 110, while the switches 142, 144, and 146 are open, which disconnect the gensets 132, 134, and 136 with the load bus 110. In FIG. 1(B), the switches 140 and 141 are closed, which connect the utilities 120 and 121 to the load buses 110 and 115 respectively, while the switches 142 through 148 are open, which disconnect the gensets 132, 134, 136, and 138 with the load buses 110 and 115.

The load bus 110 or 115 refers to the physical interconnection that carries power from the sources to loads. The load may include devices that rely on electrical power to operate, e.g., lights, motors, etc. The loads may be structured to receive power in a single, dual, or three-phase AC voltage.

The system 100 may further include one or more automatic transfer switches (not illustrated in the present figures) each coupled to two or more power sources and switching the loads therebetween. For example, the system 100 shown in FIG. 1(A) may include an ATS coupled to the utility 120 and the genset 132. In this situation, the switches 140 and 142 can be switchable contacts on the ATS that couple the power sources to the load bus. When a blackout occurs to the utility 120, the ATS can transfer the loads from the utility 120 to the genset 132 by closing the contact 142 and opening the contact 140. When the power outage of the utility 120 is over, the ATS can transfer the loads back from the genset 132 to the utility 120 by closing the contact 140 and opening the contact 142.

Figure 2:
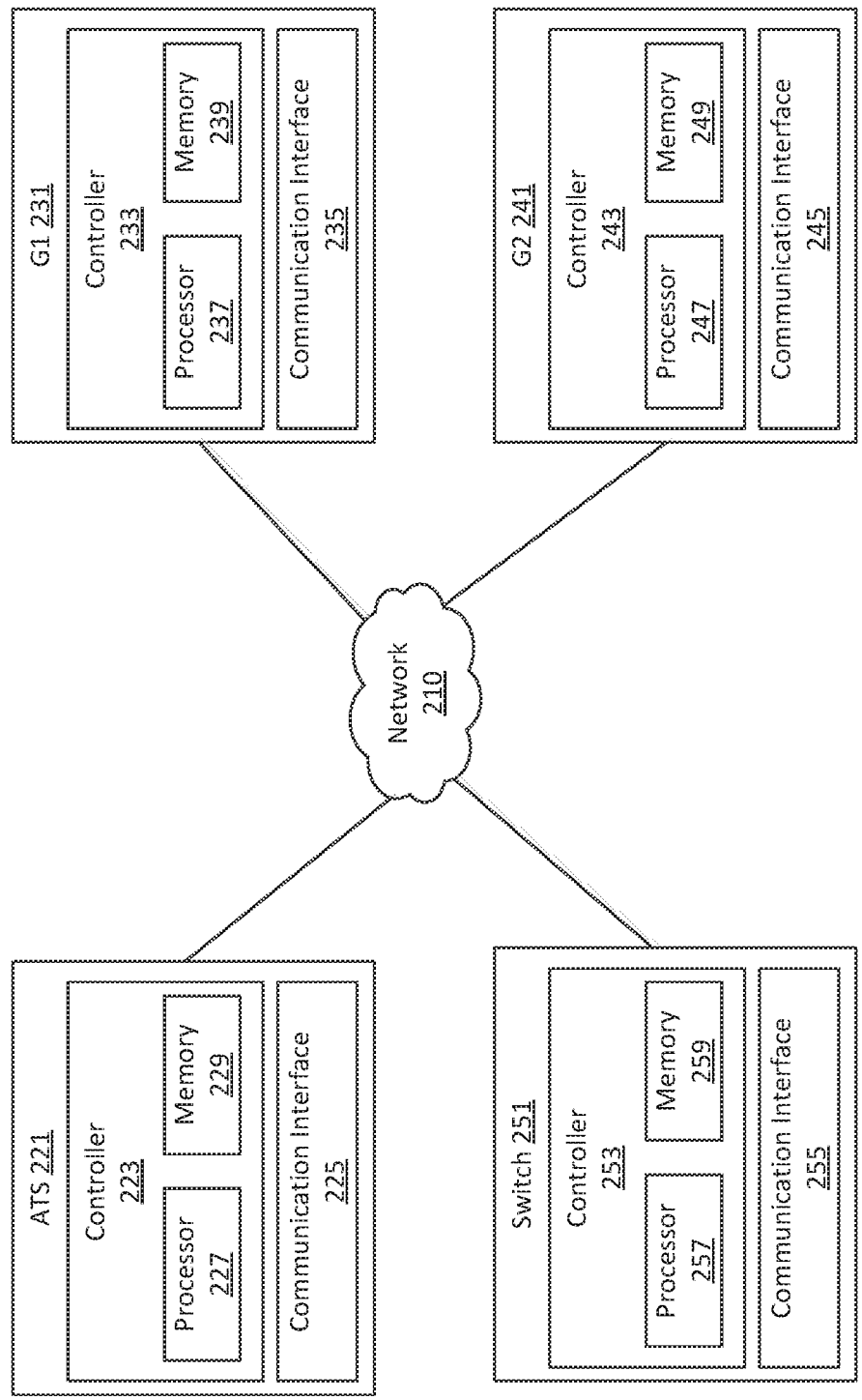
FIG. 2 is a schematic diagram of communication connections among the power generation and distribution system.

Referring to FIG. 2, a schematic diagram of communication connections among the power generation and distribution system 100 is shown according to an exemplary embodiment. As shown, gensets 231 and 241 (corresponding to the gensets 132, 134, 136, or 138 in FIG. 1) an ATS 221, and a switch 251 (corresponding to any of the switches 140 through 148 in FIG. 1) are in communication with each other over a network 210. The ATS 221 may be coupled to the utilities 120 and 121 and switch the loads therebetween, as discussed above. It shall be understood that FIG. 2 is for illustration only; the communication connections among the power generation and distribution system 100 can be arranged in any suitable manner.

The genset 231 includes a controller 233 and a communication interface 235, among other components. The controller 233 is configured to control the operations of the genset 231 and facilitate power transfer among the power generation and distribution system. The controller 233 may be implemented in various forms of hardware, firmware, special purpose processors, or a combination thereof. In some embodiments, the controller 233 is implemented on a computer platform having a processor 237 and a memory 239. The processor 237 may be structured to selectively execute instructions, commands, and the like stored by the memory 239. The processor 237 may be implemented as a general-purpose processor, an application specific integrated circuit (ASIC), one or more field programmable gate arrays (FPGAs), a digital signal processor (DSP), a group of processing components like mentioned above, or any other suitable electronic processing components. The memory 239 (e.g., NVRAM, RAM, ROM, Flash Memory, hard disk storage, etc.) may store data and/or computer code for facilitating the various processes described herein. Accordingly, the memory 239 may be or include tangible, non-transient volatile memory or non-volatile memory.

The genset 231 may receive and transmit information from and to other devices via the communication interface 233 over the network 210. The communication interface 235 may include any communication interface appropriate or compatible with the network 210, such as a modem, a network interface card (NIC), a CAN bus, a mode bus, an Ethernet, a serial bus, a wireless transceiver, etc. The genset 241 includes a controller 243, a communication interface 245, a processor 247, and a memory 249 similar to the corresponding components of the genset 231.

The ATS 221 includes a controller 223 and a communication interface 225, among other components. The controller 223 is configured to control the operations of the ATS 221 and facilitate power transfer among the power generation and distribution system. The communication interface 225 is configured to receive and transmit information from and to other devices over the network 210. The controller 223 may include a processor 227 and a memory 229 similar to the processor 237 and the memory 239, respectively. In some embodiments, the switch 251 includes a controller 253 and a communication interface 255. The controller 253 is configured to monitor the signals on both sides of the switch and control the closed or open state of the switch. The communication interface 255 is configured to receive and transmit information from and to other devices over the network 210. The controller 253 may include a processor 257 and a memory 259 similar to the processor 237 and the memory 239, respectively.

The network 210 can facilitate communication among the gensets 231, 241 the ATS 221, and the switch 251. The network 210 may be any type of suitable network. In some embodiments, the network 210 may be structured as a wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), etc. In some embodiments, the network 210 may be structured as a wired network or a combination of wired and wireless protocol. For example, a wired connection may include a serial cable, a fiber optic cable, an SAE J1939 bus, a CAT5 cable, a USB cable, a Firewire (1394 connectivity) cable, or any other form of wired connection. In some embodiments, the network 210 may be a controller area network (CAN) bus including any number of wired and wireless connections that provides the exchange of signals, information, and/or data between the gensets 231, 241, the ATS 221, and the switch 251. In some embodiments, the network 210 may be a serial bus, a mod bus, a local area network (LAN), a wide area network (WAN), etc.

Figure 3:
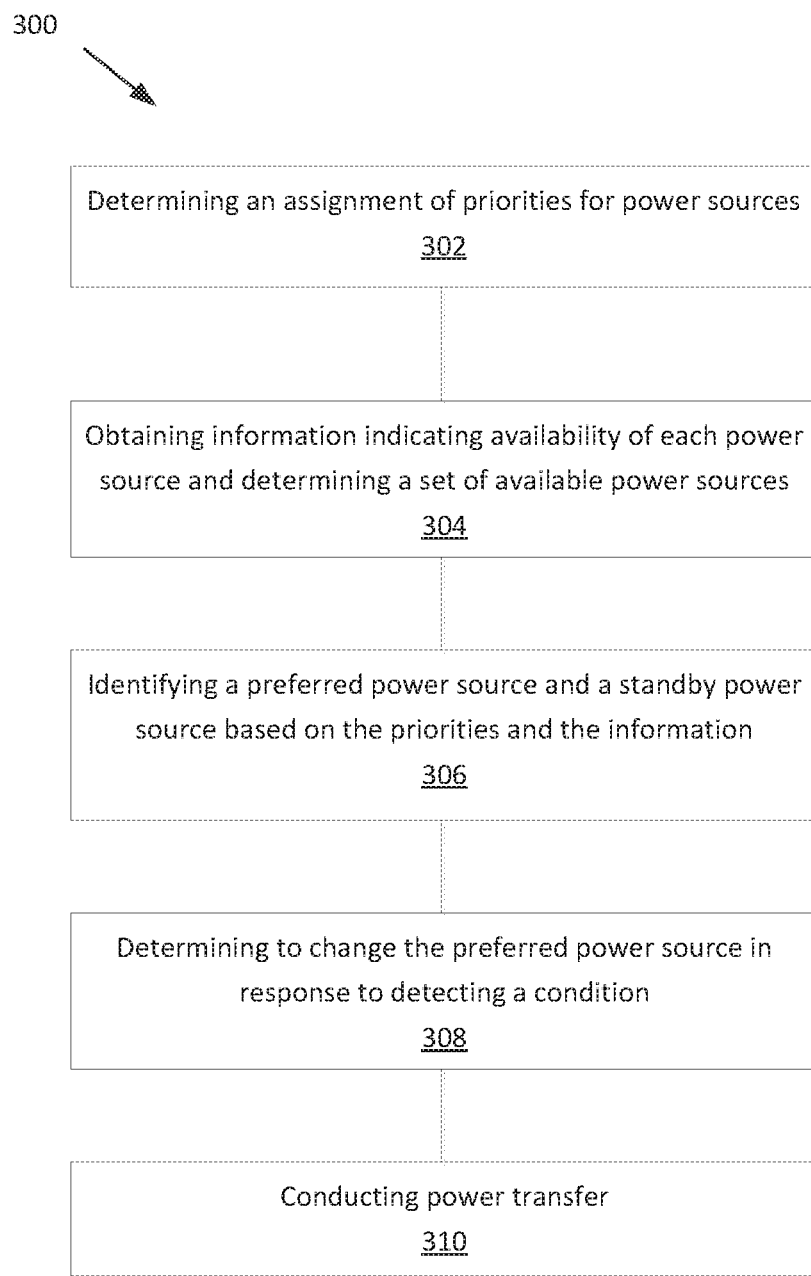
FIG. 3 is a flow chart of a power transfer control method.

Referring to FIG. 3, a flow chart of a power transfer control method 300 is shown according to an exemplary embodiment. The power transfer control method may be performed by each of the controllers 223, 233, 243, and 253.

Figure 4:
FIG. 4 is table showing priorities assigned to power sources.

At an operation 302, an assignment of priorities for each of a plurality of power sources coupled through a distribution network is determined at each power source. The priorities establish a hierarchy of the power sources for supplying power to the common load bus. In particular, in some embodiments, the source with the highest priority supplies power to the loads first. In other embodiments, the configuration of sources (e.g., configuration of multiple load sharing gensets, utility sources, and/or other sources) with the highest priority supplies power to the loads first. Only if the source with the highest priority is unavailable, will the power source or configuration of sources with the second highest priority serve, and so on. In some embodiments, the priorities is assigned by a user. For example, the gensets 231, 241, and the ATS 221 can each include a user interface (e.g., a touch screen, a keyboard, etc.), allowing the user to input the priority assignment and whether load action is required. In further embodiments, the gensets 231, 241, and the ATS 221 can each store the priority assignment in, for example, a memory. The priority assignment may be implemented as a table 400 as shown in FIG. 4. The first utility 120 is assigned the highest priority, the second utility 121 is assigned the second highest priority, then the first genset 132, the second genset 134, the third genset 136, and the fourth genset 138. In some embodiments, a group of paralleled gensets are considered one power source to the load bus and assigned the same source priority. It is noted that the paralleled gensets may also have a set load share as part of the power source configuration. Other power sources may also be configured from different arrangements of the paralleled schedules and load sharing levels.

At an operation 304, information indicating the availability of each power source is obtained and a set of available power sources from among the plurality of power sources is determined by the controller at each power source. A power source can be either "local" or "remote" to a controller. As used herein, "a power source local to a controller" means that the controller is located in physical proximity to (e.g., within a predetermined distance of) the power source and has direct control over the power source. "A power source remote to a controller" means that the controller does not have a direct control over the power source and/or is outside of the physical proximity of the power source. For example, a genset is local to the controller disposed on itself but remote to the controller disposed on another genset. Another example, in the system 100 of FIG. 1(A), if an ATS is coupled to the utility 120 and the genset 132, the utility 120 and the genset 132 are local to the controller on the ATS while the gensets 134 and 136 are remote. A controller can monitor the operations of local power source(s) via, for example, sensing circuits coupled to the power source(s). The controller can also receive information relating to operations of other power sources via a network (e.g., the network 210).

Figure 5:
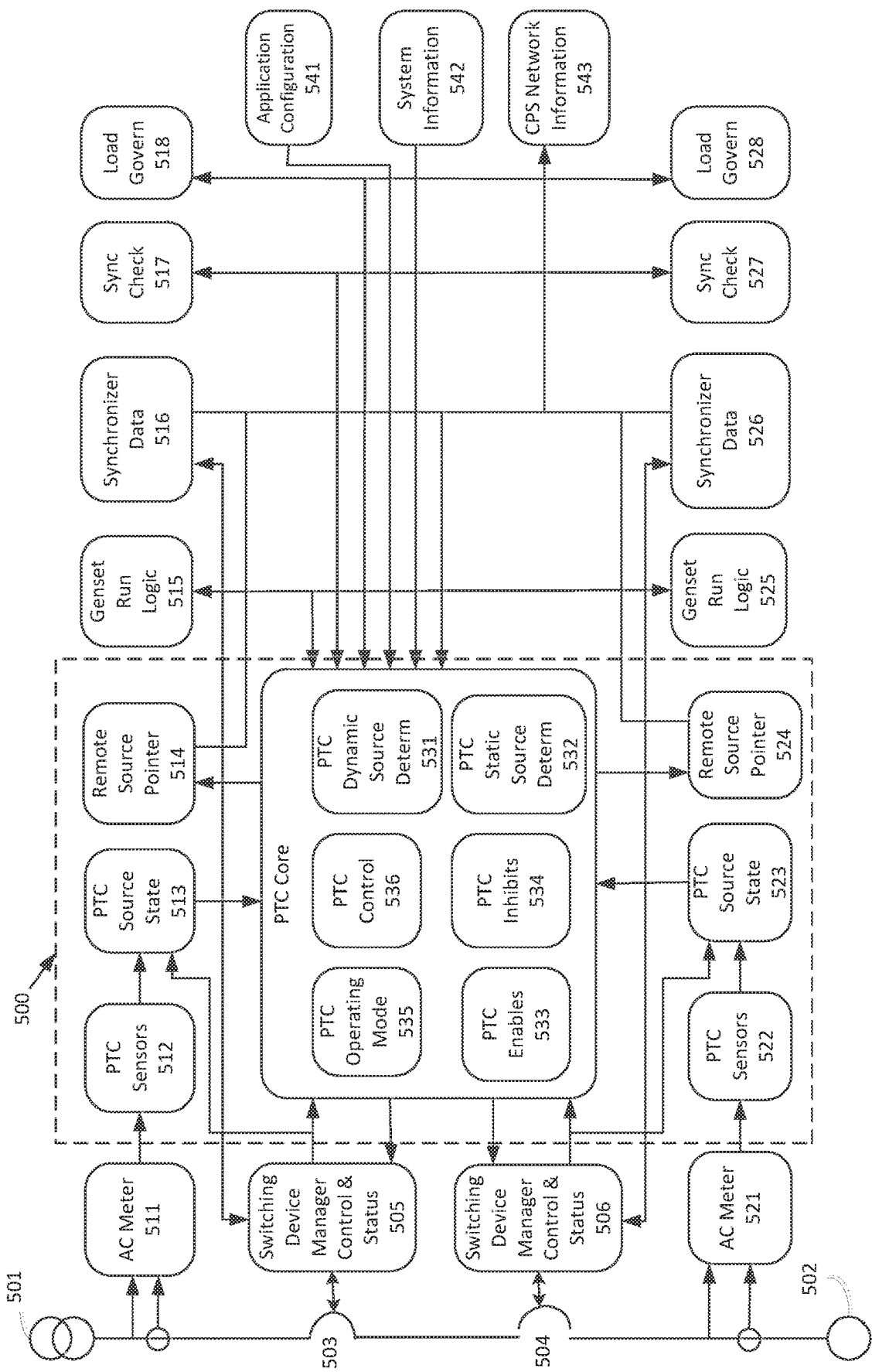
FIG. 5 is a block diagram of a power transfer controller associated with two local power sources according to an exemplary embodiment.

FIG. 5 shows a block diagram of a controller 500 associated with two local power sources 501 and 502. The two power sources 501 and 502 may include two utilities, one utility and one genset, or two gensets. The local power sources 501 and 502 may be coupled to the load bus through switches 503 and 504 respectively. The controller 500 monitors the status and condition of the local power source 501 in a first power transfer control (PTC) source state 513. The first PTC source state 513 may include data of output voltage (e.g., magnitude, phase, and/or frequency) of the local power source 501 and the connection status of the source 501 (i.e., whether the source 501 is connected to the load bus). In some embodiments, the controller 500 monitors the output voltage, current, and/or other characteristics of the source 501 through first PTC sensors 512 connected to an AC meter 511, which in turn is connected to the power source 501. In some embodiments, the controller 500 receives the connection status of the source 501 from a switching device manager 505 connected to the switch 503, which controls the closing/opening of the switch 503 and stores the close/open status of the switch 503. The controller 500 monitors a second PTC source state 523 indicating the status and condition of the local power source 502 in a similar way. In particular, the controller 500 monitors the output voltage, current, and/or other characteristics of the source 502 through second PTC sensors 522 connected to an AC meter 521, which in turn is connected to the power source 502. The controller 500 receives the connection status of the source 501 from a switching device manager 506 connected to the switch 504, which controls the closing/opening of the switch 504 and stores the close/open status of the switch 504.

Figure 6:
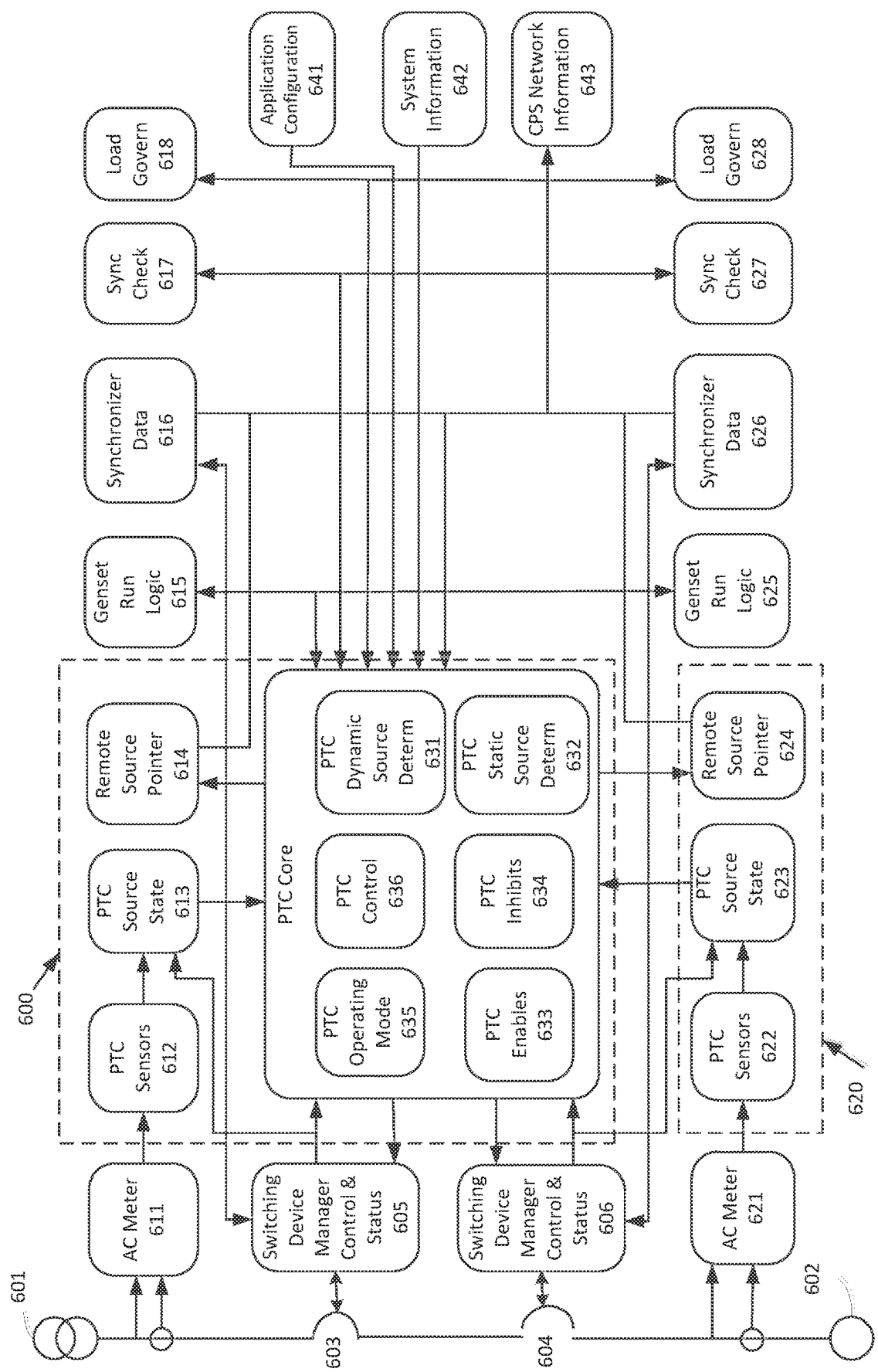
FIG. 6 is a block diagram of a power transfer controller associated with one local power source according to an exemplary embodiment.

FIG. 6 shows a block diagram of a controller 600 associated with one local power source 601 and in communication with a remote power source 602 via a network (e.g., network 210). It shall be understood that the controller 600 can communicate with all remote power sources via the network. The power sources 601 and 602 may be coupled to the load bus through switches 603 and 604 respectively. In some embodiments, the controller 600 is on an ATS that is coupled to the local source 601 and another source local to the ATS. The remote power source 602 is not directly controlled by the ATS, but under direct control of another controller 620. The controller 600 can monitor the operations of the local source 601 via local sensing circuits and receive information relating to operations of the remote source 602 via the network. In particular, the controller 600 monitors the output voltage of the local source 601 through first PTC sensors 612 connected to an AC meter 611, which in turn is connected to the power source 601. The controller 600 receives the connection status of the source 601 from a switching device manager 605 connected to the switch 603, which controls the closing/opening of the switch 603 and stores the close/open status of the switch 603. Operations of the remote power source 602 are controlled and monitored by another controller 620 local to the power source 602. The controller 620 monitors the output voltage of the source 602 through PTC sensors 622 connected to an AC meter 621, which in turn is connected to the power source 602, and connection status of the source 602 from a switching device manager 606 connected to the switch 604, which controls the closing/opening of the switch 604 and stores the close/open status of the switch 604 which may be local to the controller or remote with the controller 620. The controllers 600 and 602 can transmit the information relating to operations of the power source(s) obtained locally to each other and can each obtain information relating to operations of all power sources coupled to the common load bus.

Referring again to FIG. 3, at an operation 306, each controller identifies a preferred power source and a standby power source based on the priorities and the information obtained. The preferred power source and the standby power source are among the set of available power sources, and the priority of the preferred power source is higher than the priority of the standby power source. In some embodiments, the preferred power source has the highest priority among the sources currently available; the standby power source has the second highest priority among the sources currently available. In some embodiments, the preferred power source and the standby power source do not have to be the highest and the second highest priority, as long as the standby power source has a lower priority than the preferred power source. The controller 500 in FIG. 5 may include a PTC dynamic source determination circuit 531 and a PTC static source determination circuit 532. If there are only two power sources coupled to the load bus, the PTC dynamic source determination circuit 531 would not work while the PTC static source determination circuit 532 determines a power source with the higher priority as the preferred power source and the other power source with the lower priority as the standby source. Since there are only two sources coupled to the load bus, the determination will not change and therefore is static.

If there are more than two power sources or configurations of paralleled power sources coupled to the load bus, the PTC dynamic source determination circuit 531 dynamically determines the preferred power source and the standby power source. Take the power sources shown in FIG. 1(B) with priorities assignment as shown in FIG. 4 as an example. If all power sources including the utilities 120 and 121 and the genset 132, 134, and 136 are available, then the controller 500 determines the utility 120 with priority "1" as the preferred power source and the utility 121 with priority "2" as the standby power source, in some embodiments. When a blackout occurs to the utility 120, which becomes unavailable, the controller 500 then determines the utility 121 as the preferred power source and the genset 132 as the standby source is the genset 132 is available. If the genset 132 is unavailable, the controller 500 determines the genset 134 as the standby power source, or the paralleled combination of gensets 134 and 136, and so on. In some embodiments, the availability of a power source is determined by its local controller and transmitted by the local controller to all other controllers over the network. The controller 600 in FIG. 6 includes a PTC dynamic source determine circuit 631 and a PTC static source determination circuit 632 similar to the PTC dynamic source determination circuit 531 and the PTC static source determination circuit 632, respectively.

In some embodiments, the preferred power source includes a first load sharing profile corresponding to a first load level on the common load bus, and the standby power source includes a second load sharing profile corresponding to a second load level on the common load bus. When the load level changes, the preferred sharing load profile might change accordingly. In some embodiments, the preferred power source includes a first set of parameters of generator sets corresponding to a first load level on the common load bus, and the standby power source includes a second set of parameters of generators sets corresponding to a second load bus. In some embodiments, the first power source includes a first configuration of a set of generator sets, the second power source includes a second configuration of the same set of generator sets. In some embodiments, the power sources include at least one solar power source. The preferred power source may change with the change of the sunlight power density. In some embodiments, the preferred power source may change with the change of the amount of runtime for each generator set, and/or the wear condition of each generator set.

At an operation 308, the controller determines to change the preferred power source from a first power source to a second power source in response to detecting a condition. The preferred power source is determined dynamically and can change under various conditions, for example, where the currently preferred power source becomes unavailable due to an outage of the utility or faults of the genset. The controller would determine the current standby power source to be the new preferred power source and the next available power source to be the new standby power source. Changes in the loads can also result in a change of the preferred power source, such as a full paralleled configuration or all available gensets for a heavy load profile or a more fuel efficient or reduced set of paralleled gensets when the load is light. Another situation is where a power source with higher priority which was previously unavailable becomes available, e.g., the outage of the utility is over or faults on the genset are fixed. The controller would determine the power source with higher priority to be the new preferred power source and the currently preferred power source to be the new standby power source. With the change of the preferred power source, the controller can set a remote source pointer (e.g., the remote source pointer 514 in FIG. 5 and the remote source pointer 614 in FIG. 6) pointing to the new preferred source and use the remote source pointer for the power transfer control. Since the controller can use the remote source pointer to identify the power source involved in the transfer, the controller does not need to distinguish a transfer between two local sources from a transfer between a local source and a remote source. This allows the controller to function the same whether there are two local sources or one local and one remote source involved in the transfer.

At an operation 310, a power transfer between the first power source and the second power source is conducted at the first and second power sources in response to determining to change the preferred power source to the second power source. In some embodiments, the controller may first determine whether the power transfer is enabled or inhibited by checking associated parameters (e.g., parameters PTC Enables 533 and PTC inhibits 534 in FIG. 5 and parameters PTC Enables 633 and PTC inhibits 534 in FIG. 6). For example, some users might not want to use the network to start a genset, but would use the remote start of the genset during, for example, maintenance when the local start is locked out to prevent harm when people are working, or when no source is available.

In some embodiments, the controller may determine the transition type for the power transfer between the old preferred power source and the new preferred power source. For example, a user can specify that if the power transfer is between two utilities, the transition type is an "open transition." During the open transition, the old preferred power source is disconnected with the load bus (e.g., the corresponding switch is opened) before the new preferred power is connected (e.g., the corresponding switch is closed), causing a power interruption for a short period of time (e.g., from less than one second to three minutes). If the power transfer is between one utility and one genset, the transfer operates like the open transition if the transfer happens because a source has failed (e.g., the utility has failed). But when the transfer is between live sources (e.g., the utility is back), the transition is a "soft closed transition," where the sources are synchronized and connected together (i.e., paralleled) to the load bus for a period of time (e.g., from less than one second to three minutes) before the old preferred power source is disconnected. The disturbance can be minimum in this situation. If the power transfer is between two gensets, the transfer operates like the open transition if the transfer happens because a source has failed (e.g., faults happened to a genset). But when the transfer is between live sources, the transition is a "fast closed transition," where the old and new sources are paralleled for a very short period of time (e.g., from ten milliseconds to one hundred milliseconds) before the old source is disconnected. Thus, a total interruption of power can be avoided. A PTC operating mode circuit (e.g., the PTC operating mode circuit 535 in FIG. 5 and the PTC operating mode circuit 635 in FIG. 6) can determine the transition type based on the types of the old and new preferred power sources and operations of the PTC dynamic source determination circuit 531, 532, 631, and 632.

In some embodiment, the controller may conduct power transfer based on the transition type determined. If the transition is an open type, i.e., transfer between two utilities, or transfer between a utility and a genset due to failure of one source, or transfer between two gensets due to failure of one source, the controller first disconnects the old preferred power source with the load bus, then connects the new preferred power source with the load bus. In particular, if the old and new preferred power sources are both local sources as shown in FIG. 5, when the old source 501 fails, the PTC control circuit 536 on the controller 500 first sends an "Open" signal to the switching device manager 505 which controls the switch 503 associated with the old preferred power source 501. The switching device manager 505, upon receiving the signal, opens the switch 503 thereby disconnecting the old source 501 with the load bus. If the new preferred power source is another utility, the PTC control circuit 536 sends a "Close" signal to the switching device manager 506 which controls the switch 504 associated with the new preferred power source 502. The switching device manager 506, upon receiving the signal, closes the switch 504 thereby connecting the new source 502 with the load bus. If the new preferred power source is a genset, the PTC control circuit 536 sends a "Start" signal to the new source 502 to start the genset. It is noted that this may already be occurring under the direction of the new source 502 genset's local PTC control circuit, if it is monitoring the available source status and condition via the network or local sensors. When the new source 502 is starting, the PTC control circuit 536 monitors the output voltage (e.g., magnitude and frequency) of the source through second PTC sensors 522 connected to the AC meter 521, which in turn is connected to the new source 502. when the output voltage has achieved proper voltage (e.g., proper magnitude and frequency), the PTC control circuit 536 sends a "Close" signal to the switching device manager 506. The switching device manager 506, upon receiving the signal, closes the switch 504 thereby connecting the new source 502 with the load bus. After the power is transferred from the old source 501 to the new source 502, the controller 500 identifies a new standby source based on information relating to the power sources coupled to the load bus.

If the new preferred power source is remote to the controller as shown in FIG. 6, the operations are the same except that the PTC control circuit 636 on the controller 606 sends the "Start" signal to the controller 602 local to the new source 602 and the "Close" signal to the switching device manager 606 over the network, and receives data of the output voltage (e.g., magnitude and frequency) of the new source 602 from the controller 602 over the network.

If the transition is a closed type, i.e., a soft closed transition between a live utility and a live genset, or a fast closed transition between the two live gensets, the controller synchronizes the old and new sources, connects the new source with the load bus, and then disconnects the old source with the load bus. In particular, if the old and new preferred power sources are both local sources as shown in FIG. 5, when the new source 502 is available (e.g., outage is over, fault is fixed, etc.), the PTC control circuit 536 facilitate synchronization of one source to the other. If the old and new sources include a utility and a genset, the genset is synchronized to the utility. If the old and new sources are both gensets, the new source is synchronized to the old source, or vice versa. As used herein, synchronizing means matching the frequency, phase, and magnitude of the output voltage of a source to those of the other source. The sources are synchronized before being paralleled to avoid disruption to the loads because a small difference in the frequency, phase, or magnitude between the sources may create large overcurrent.

Take an example to illustrate the synchronization process in which the source 502 is the new preferred power source and is to replace and be synchronized to the source 501 that is supplying power to the load bus. Data of the output voltage of the source 501 can be collected by the PTC sensors 512 connected to the AC meter 511 which senses the output voltage of the source 501. The PTC control circuit 536 can store the data as synchronizer data 516 which may include data of magnitude, frequency, and phase of the output voltage of the source 501. Data of the output voltage of the source 502 can be collected by the PTC sensors 522 connected to the AC meter 521 which senses the output voltage of the source 502. The PTC control circuit 536 can store the data as synchronizer data 526 which may include data of magnitude, frequency, and/or phase of the output voltage of the source 502. A genset run logic 525 on the source 502 runs the synchronization algorithm using the synchronizer data 516 and 526. The level of the field current of a genset determines the magnitude of the output voltage of the genset. The genset run logic 525 may adjust the field current through, for example, an automatic voltage regulator (AVR) on the source 502, to match the magnitude of its output voltage to that of the output voltage of the source 501. The genset run logic 525 may adjust the speed of the engine of the genset through, for example, a speed governor, to match the frequency and phase of its output voltage to those of the output voltage of the source 501.

In some embodiments, the switching device manager 506 may check whether the synchronization has been achieved. In particular, sync check 517 and 527 may be used to check that two power sources 501 and 502 are synchronized to one another so that they can be electrically connected to one another. As used herein, synchronization means that the amplitude, frequency, and phase angle of two power sources are matched. In some embodiments, some deviation is allowed from the ideal case of perfectly matched. Being synchronized insures that there will be minimal electrical and mechanical stress induced when the two sources are electrically coupled.

In some embodiments whereby two or more genset are paralleled, how much of the load each power source should carry may be determined when the power sources have been connected to each other (i.e., "paralleled"). In some embodiments whereby gensets are paralleled to each other, a "load sharing" arrangement may be made, which may split the load between gensets on a percentage basis of rating. In some embodiments whereby genset(s) are paralleled to a utility, a "load governing" arrangement may be made, which directly commands each genset how much power to produce at any given time. The purpose of load governing may include, for example, holding the utility import power level fixed even if the total system load may vary. The load governing arrangement may need to vary the power produced by the gensets in order to accommodate variations in load. Load govern 518 and 528 indicate whether the load governing arrangement is made for the power source 501 and 502. For example, load governing arrangement may be made during the soft closed transition transfer of load between a genset(s) and a utility. Load governing arrangement may also be made during a soft closed transition transfer of load between one genset and another genset (of busses of gensets).

The switching device manager 506 may acquire the data of the output voltage of the source 502 (e.g., in the synchronization data 526) and compare the data with the output voltage of the source 501. The switching device manager 506 can calculate the magnitude difference, phase difference, and frequency difference between output voltages of the two sources. If all the differences are within predetermined thresholds, the switching device manager 506 determines that the synchronization has been achieved and sends a "Power Ready" signal to the PTC control circuit 536.

The PTC control circuit 536, upon receiving the "Power Ready" signal from the switching device manager 506, sends back a "Close" signal to the switching device manager 506 which controls the switch 504 associated with the source 502. The switching device manager 506, upon receiving the signal, closes the switch 504 thereby connecting the new source 502 with the load bus, temporarily bringing the old and new sources 501 and 502 into parallel operation.

After a period of time, the PTC control circuit 536 on the controller 500 sends an "Open" signal to the switching device manager 505 which controls the switch 503 associated with the old preferred power source 501. The switching device manager 505, upon receiving the signal, opens the switch 503 thereby disconnecting the old source 501 with the load bus. For the soft closed transition, the period of time of parallel operation can be, for example, from less than one second to three minutes. For the fast closed transition, the period of time of parallel operation is very short (e.g., from ten milliseconds to one hundred milliseconds). After the power is transferred from the old source 501 to the new source 502, the controller 500 identifies a new standby source based on information relating to the power sources coupled to the load bus.

If the new preferred power source 602 is remote to the controller as shown in FIG. 6, the operations are the same as discussed above except that the PTC control circuit 636 communicates with the controller 620 local to the source 602 and switching device manager 606 over the network.

In some embodiments, the controller 500 may use application configuration 541, system information 542, and connected power system (CPS) network information 543 to configure the settings of the power transfer control. In particular, the application configuration 541 may include settings that define, for example, the priority assigned to the power source. The application configuration 541 may include other settings that influence how the power transfer, such as timer settings for different operations in the transfer. The system information 542 may include information coming from external, but locally originating on the power source, for example, a command telling the controller to go into Test mode. The CPS network information 543 may include data transmitted across the network to different controller(s) in order to facilitate the distributed power transfer.

In the systems and methods disclosed herein, each local controller can make decisions based on all available data on the network and/or being commanded from another controller. This reduces single point failures. With the connected power system (CPS) network capabilities, a genset will be able to determine when to start. For example, when the source that has a higher priority than the genset becomes not available, the genset will start and make itself available to the load bus.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An automatic transfer switch structured to be coupled to a first power source and a second power source, comprising:
    one or more controller circuits configured to:
        determine an assignment of priorities for each of a plurality of power sources coupled through a distribution system, wherein the priorities establish a hierarchy of the power sources for supplying power to a load;
        obtain information indicating an availability of each of the plurality of power sources and determine a set of available power sources from among the plurality of power sources based on the information;
        identify a preferred power source and a standby power source from the plurality of power sources based on the priorities and the information, wherein the preferred power source and the standby power source are among the set of available power sources, and wherein the priority of the preferred power source is higher than the priority of the standby power source;
        determine to change the preferred power source from the first power source to the second power source in response to detecting a condition; and
    a switching device configured to:
        transfer power between the first power source and the second power source in response to determining to change the preferred power source to the second power source.

2. The automatic transfer switch of claim 1, the one or more controller circuits further configured to:
    determine a voltage of the first power source using a sensor; and
    synchronize a characteristic of the second source to match a corresponding characteristic of the first source.

3. A method of power transfer control among a plurality of power sources coupled through a distribution system, comprising:
    determining, at a controller of each of the plurality of power sources, a preferred load sharing profile, and a standby load sharing profile;
    identifying, at the controller of each of the plurality of power sources, a preferred power source and a standby power source based on the preferred load sharing profile and the standby load sharing profile, respectively;
    detecting, at the controller of each of the plurality of power sources, a change in a load level at a load bus;
    determining, at the controller of each of the plurality of power sources, to change the preferred load sharing profile from a first load sharing profile to a second load sharing profile in response to detecting a change in load at the load bus, wherein the first load sharing profile includes a first configuration of the plurality of power sources, and the second load sharing profile includes a second configuration of the plurality of power sources;
    conducting, at the controller of each of the plurality of power sources, a power transfer between the first configuration of the plurality of power sources and the second configuration of the plurality of power sources in response to determining to change the preferred load sharing profile from the first load sharing profile to a second load sharing profile.

4. The method of claim 3, wherein the first configuration of the plurality of power sources and the second configuration of the plurality of power sources are selected from a same set of gensets.

5. The method of claim 3, wherein at least one power source in the plurality of power sources includes a solar power source.

6. The method of claim 3, further comprising:
    detecting a change in sunlight power density; and
    determining, at the controller of each of the plurality of power sources, to change the preferred load sharing profile from the first load sharing profile to a second load sharing profile in response to detecting the change in the sunlight power density.

7. The method of claim 3, further comprising:
    detecting a change in at least one of a runtime or a wear condition of a genset of the plurality of power sources; and
    determining, at the controller of each of the plurality of power sources, to change the preferred load sharing profile from the first load sharing profile to a second load sharing profile in response to detecting the change in at least one of the runtime or the wear condition of the genset.

8. The method of claim 3, wherein the second configuration of the plurality of power sources includes a full paralleled configuration of all available gensets in the plurality of power sources or a paralleled configuration of a reduced number of all available gensets.

9. The method of claim 3, further comprising:
    detecting unavailability of the preferred power source; and
    determining, at the controller of each of the plurality of power sources, to change the preferred load sharing profile from the first load sharing profile to a second load sharing profile in response to detecting the unavailability of the preferred power source.

10. The method of claim 3, wherein conducting, at the controller of each of the plurality of power sources, the power transfer between the first configuration of the plurality of power sources and the second configuration of the plurality of power sources includes setting a remote source pointer pointing to at least one power source included in the second configuration of the plurality of power sources.

11. The method of claim 3, further comprising:
determining, at the controller of each of the plurality of power sources, an assignment of priorities for each of the plurality of power sources; wherein the priorities establish a hierarchy of the power sources for supplying power to a load;
identifying, at the controller of each of the plurality of power sources, the preferred power source and the standby power source based on the priorities, wherein the priority of the preferred power source is higher than a priority of the standby power source.

12. The method of claim 11, further comprising:
detecting, at the controller of each of the plurality of power sources, availability of a previously unavailable power source having a priority that is higher than a priority of the preferred power source; and
conducting, at the controller of each of the plurality of power sources, a power transfer from the preferred power source to the previously unavailable power source; and
designating, at the controller of each of the plurality of power sources, the preferred power source as the standby power source.

13. The method of claim 3, further comprising:
conducting the power transfer between the first configuration of the plurality of power sources and the second configuration of the plurality of power sources based on inhibit or enable parameters associated with the plurality of power sources.

14. The method of claim 3, wherein conducting the power transfer comprises:
determining that the power transfer is an open transition type;
disconnecting the first configuration of the plurality of power sources from the load bus, and connecting the second configuration of the plurality of power sources to the load bus.

15. The method of claim 3, wherein conducting the power transfer comprises:
determining that the power transfer is a closed transition type;
connecting the second configuration of the plurality of power sources to the load bus; and
disconnecting the first configuration of the plurality of power sources from the load bus after the second configuration of the plurality of power sources is connected to the load bus for a period of time.

16. The method of claim 15, wherein conducting the power transfer further comprises:
synchronizing an output voltage of the second configuration of the plurality of power sources to an output voltage of the first configuration of the plurality of power sources; and
connecting the second configuration of the plurality of power sources to the load bus in response to synchronization being achieved.

17. The method of claim 16, wherein the period of time is in a range of less than one second to three minutes.

18. The method of claim 16, wherein the period of time is in a range of ten milliseconds to one hundred milliseconds.

19. The method of claim 3, further comprising:
configuring the controllers of each of the plurality of power sources over a communication network.

* * * * *